United States Patent
Tamura

(10) Patent No.: US 10,455,118 B2
(45) Date of Patent: Oct. 22, 2019

(54) GENERATION METHOD, STORAGE MEDIUM, AND IMAGE FORMING APPARATUS THAT GENERATE A THRESHOLD MATRIX BY USING DETERMINED THRESHOLDS

(71) Applicant: CANON KABUSHIKI KAISHA, Tokyo (JP)

(72) Inventor: Hirokazu Tamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/229,391

(22) Filed: Dec. 21, 2018

(65) Prior Publication Data
US 2019/0208082 A1 Jul. 4, 2019

(30) Foreign Application Priority Data
Dec. 28, 2017 (JP) ................................. 2017-254400

(51) Int. Cl.
*H04N 1/405* (2006.01)
*H04N 1/52* (2006.01)

(52) U.S. Cl.
CPC ............. *H04N 1/4051* (2013.01); *H04N 1/52* (2013.01)

(58) Field of Classification Search
CPC .............................. H04N 1/4051; H04N 1/52
See application file for complete search history.

(56) References Cited

U.S. PATENT DOCUMENTS

| | | | | |
|---|---|---|---|---|
| 5,815,286 A | * | 9/1998 | Matsuba | H04N 1/52 358/3.19 |
| 2008/0074701 A1 | * | 3/2008 | Asai | H04N 1/4055 358/3.09 |

FOREIGN PATENT DOCUMENTS

JP 2006-086785 A 3/2006

* cited by examiner

*Primary Examiner* — Quang N Vo
(74) *Attorney, Agent, or Firm* — Venable LLP

(57) ABSTRACT

An information processing apparatus, in accordance with rising density in an extreme density range, determines a threshold for setting each pixel of a threshold matrix so as to consecutively grow an isolated dot corresponding to a halftone dot in a low density range to a first dot size for each submatrix, sets, when the size of isolated dots in a predetermined number of submatrices is grown to the first dot size, an intermediate position between the isolated dots in the predetermined number of submatrices; and determines, for each of one or more submatrices including a set intermediate position, a threshold to set for each pixel of the threshold matrix so that an isolated dot is consecutively grown until a second dot size smaller than the first dot size.

10 Claims, 14 Drawing Sheets

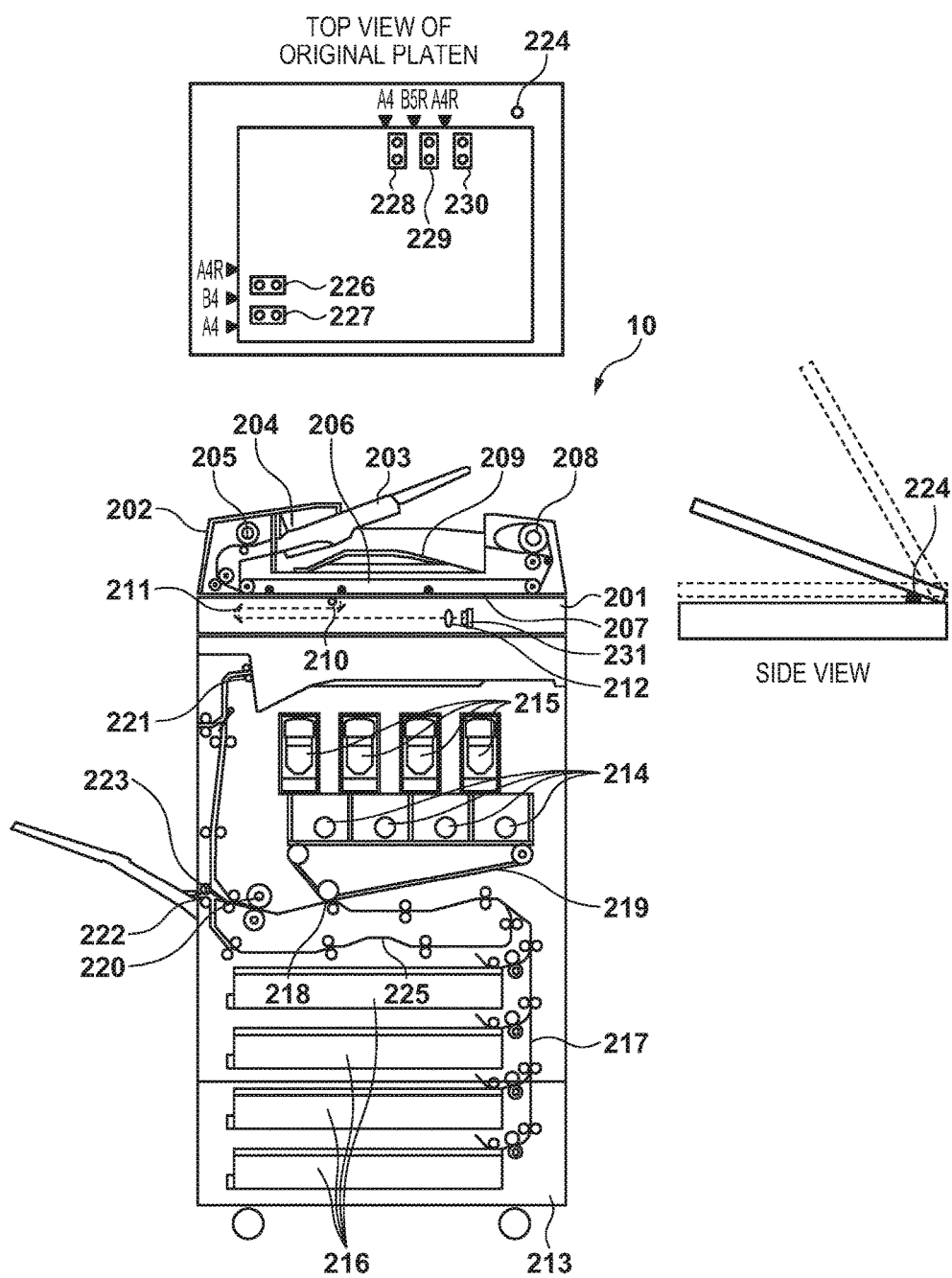

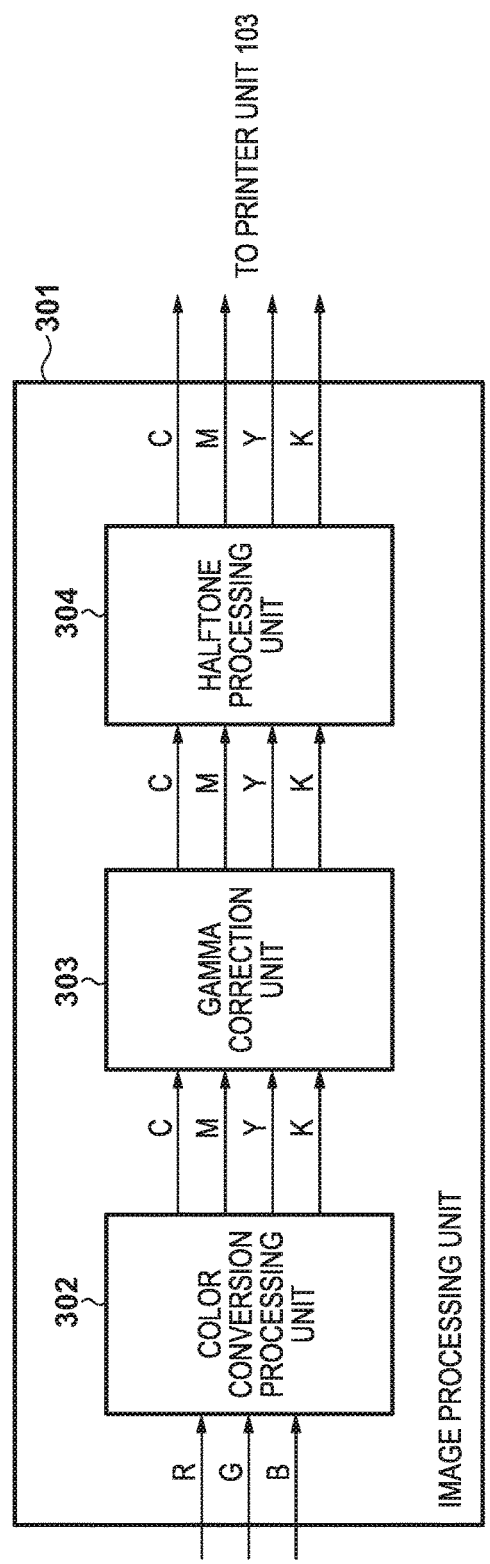

GENERATION METHOD, STORAGE MEDIUM, AND IMAGE FORMING APPARATUS THAT GENERATE A THRESHOLD MATRIX BY USING DETERMINED THRESHOLDS

Claim to Priority

This application claims the benefit of Japanese Patent Application No. 2017-254400 filed on Dec. 28, 2017, which is hereby incorporated by referece herein in its entirety.

BACKGROUND OF THE INVENTION

Field of the Invention

The present invention relates to a generation method, storage medium therefor, and an image forming apparatus.

Description of the Related Art

An electro-photographic method is known as an image recording method used in an image forming apparatus such as a printer or a copying machine. The electro-photographic method is a technique for forming a latent image on a photosensitive drum using a laser beam, and developing charged coloring material (hereafter referred to as toner). Recording an image is performed by transferring the image according to the developed toner to a printing medium and fixing it thereto. At that time, image data inputted into the image forming apparatus is a multi-tone image that includes halftones, but since it is difficult to obtain a halftone image in the above-described electro-photographic method, typically, in a pseudo halftone method that uses dithering, multi-tone image data is converted into a low tone image of binary values or the like, and recorded.

In a pseudo halftone method referred to as AM screening, this binary image data is data that, using a repeating pattern of small dots called halftone dots represents tones by the size of those dots. In this dithering, a threshold matrix having N×M thresholds is used to obtain a threshold from the threshold matrix in accordance with a pixel position in multi-tone image data, and conversion into halftone dot image data can be performed by comparing each pixel with a threshold. Thresholds are arranged so the above-described threshold matrix is formed at regular intervals where halftone dots have a particular angle. Typically, the threshold matrix is designed so that halftone dots form different angles for each coloring material in a color image forming apparatus.

Also, there is a pseudo halftone method referred to as FM screening. For this, as well, a threshold matrix is similarly used, and tones are represented at a dot density rather than dot amplitude (size). At that time, dots are arranged at a high cycle and randomly, and, so that a repetitive cycle of the threshold matrix is not seen, the threshold matrix must be of a very large size in relation to normal dithering.

Also, in particular, in an image forming apparatus that uses an electro-photographic method, toner does not adhere to a printing medium easily when the halftone dots are small, and in particular, there is a problem that reproducibility and graininess of halftone dots of a low density range deteriorates. For this reason, Japanese Patent Laid-Open No. 2006-86785 proposes a method of, by concentrating and growing halftone dots until a predetermined size is reached in a low density range and growing different halftone dots after a particular size has been first achieved, improving reproducibility and graininess of low density ranges.

There is a problem, however, as discussed below, in the foregoing conventional technique. For example, in the foregoing conventional technique, on top of growing halftone dots to a predetermined size or greater in order to improve reproducibility of halftone dots of a low density range, halftone dots are formed at random positions on a two-dimensional plane. A threshold matrix having such randomness, as is typified in FM screening methods, typically requires a very large sized memory in order to make it difficult to observe the repetitive cycle.

Meanwhile, when representing densities by a repetition of sixteen or so halftone dots without any randomness, a method of generating halftone dots in a Bayer pattern order is typically taken. If this is the case, the threshold matrix is small and a large memory is not needed, but unnatural halftone dot texture repetition can be observed depending on the density range, and this leads to image quality degradation.

Specifically, there is a trade-off between improvement of reproducibility in low density halftone dots and reduction of the size of the threshold matrix.

SUMMARY OF THE INVENTION

The present invention enables realization of a mechanism that improves reproducibility and graininess of halftone dots in extreme density ranges, while restraining the size of the threshold matrix needed for processing and suppressing unnatural textures of halftone dots.

One aspect of the present invention provides a method of generating a threshold matrix that includes a plurality of submatrices divided into a lattice form and is for converting multi-tone image data into image data of a lower number of tones, the method comprising determining, in accordance with rising density in an extreme density range, a threshold for setting each pixel of the threshold matrix so as to consecutively grow an isolated dot corresponding to a halftone dot in a low density range to a first dot size for each submatrix setting, when the size of isolated dots in a predetermined number of submatrices is grown to the first dot size, an intermediate position between the isolated dots in the predetermined number of submatrices, determining, for each of one or more submatrices including the set intermediate position, a threshold to set for each pixel of the threshold matrix so that an isolated dot is consecutively grown until a second dot size smaller than the first dot size, and generating the threshold matrix by using the determined thresholds.

Another aspect of the present invention provides a non-transitory storage medium storing a program for causing a computer to execute each step of a method of generating a threshold matrix that includes a plurality of submatrices divided into a lattice form and is for converting multi-tone image data into image data of a lower number of tones, the method comprising determining, in accordance with rising density in an extreme density range, a threshold for setting each pixel of the threshold matrix so as to consecutively grow an isolated dot corresponding to a halftone dot in a low density range to a first dot size for each submatrix, setting, when the size of isolated dots in a predetermined number of submatrices is grown to the first dot size, an intermediate position between the isolated dots in the predetermined number of submatrices, determining, for each of one or more submatrices including the set intermediate position, a threshold to set for each pixel of the threshold matrix so that the isolated dot is consecutively grown until a second dot size smaller than the first dot size, and generating the threshold matrix by using the determined thresholds.

Still another aspect of the present invention provides a non-transitory storage medium storing a program for causing a computer to execute each step of a method of generating a threshold matrix that includes a plurality of submatrices divided into a lattice form and is for converting multi-tone image data into image data of a lower number of tones, the method comprising determining, in accordance with falling density in an extreme density range, a threshold for setting each pixel of the threshold matrix so as to consecutively grow an isolated blank dot corresponding to a blank area hole in a high density range to a first dot size for each submatrix, setting, when the size of the isolated blank dots in a predetermined number of submatrices is grown to the first dot size, an intermediate position between the isolated blank dots in the predetermined number of submatrices determining, for each of one or more submatrices including the set intermediate position, a threshold to set for each pixel of the threshold matrix so that the isolated blank dot is consecutively grown until a second dot size smaller than the first dot size, and generating the threshold matrix by using the determined thresholds.

Yet still another aspect of the present invention provides an image forming apparatus comprising a memory configured to store a threshold matrix for executing halftone processing for converting a multi-tone input image data into output image data of a lower number of tones, a controller unit comprising a processor for executing a program or a hardware circuit, and a printing device, wherein the controller unit uses the threshold matrix stored in the memory to execute halftone processing in relation to the input image data, and to generate output image data, controls the printing device to cause the printing device to print on a sheet an image based on the output image data, wherein the threshold matrix has a plurality of submatrices, and, in a case when screen processing is executed in relation to input image data configured by a first density (1) for a first submatrix, thresholds are arranged so that a dot of a first size is outputted, (2) for a second submatrix, thresholds are arranged so that in a case where screen processing is executed in relation to a region of the first density, a dot of a second size smaller than the first size is outputted, and (3) for a third submatrix and a fourth submatrix, thresholds are arranged so that, in a case when screen processing is executed in relation to a region of the first density, a dot is not outputted, and, in a case when screen processing is executed in relation to input image data configured by a second density that is higher than a first density, (4) for the first submatrix and the second submatrix, thresholds are arranged so that a dot of the first size is outputted, (5) for a third submatrix, thresholds are arranged so that a dot of the second size is outputted, and (6) for a fourth submatrix, thresholds are arranged so that a dot is not outputted, (7) in a case when screen processing is executed in relation to input image data configured by a third density that is higher than the second density, for the plurality of submatrices, thresholds are arranged so that a dot of the first size is outputted, and (8) in a case when screen processing is executed in relation to input image data configured by a density higher than the third density, in accordance with the density of the input image data becoming higher, thresholds are arranged so that the size of a configured dot becomes larger.

Further features of the present invention will be apparent from the following description of exemplary embodiments with reference to the attached drawings.

BRIEF DESCRIPTION OF THE DRAWINGS

FIG. 2 is a cross-sectional view of an image forming apparatus according to an embodiment.

FIG. 3 is a block diagram that illustrates image processing for printing according to an embodiment.

FIGS. 4A-4D are views that illustrate an example of a threshold matrix according to an embodiment.

FIGS. 5A-5F are views that illustrate an example of a threshold matrix according to an embodiment.

FIGS. 6A-6F are views that illustrate an example of a threshold matrix according to an embodiment.

FIGS. 8A-8F are views that illustrate an example of a threshold matrix according to an embodiment.

FIGS. 9A-9F are views that illustrate an example of a threshold matrix according to an embodiment.

DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Hardware Configuration of Image Forming Apparatus>

Figure 1:
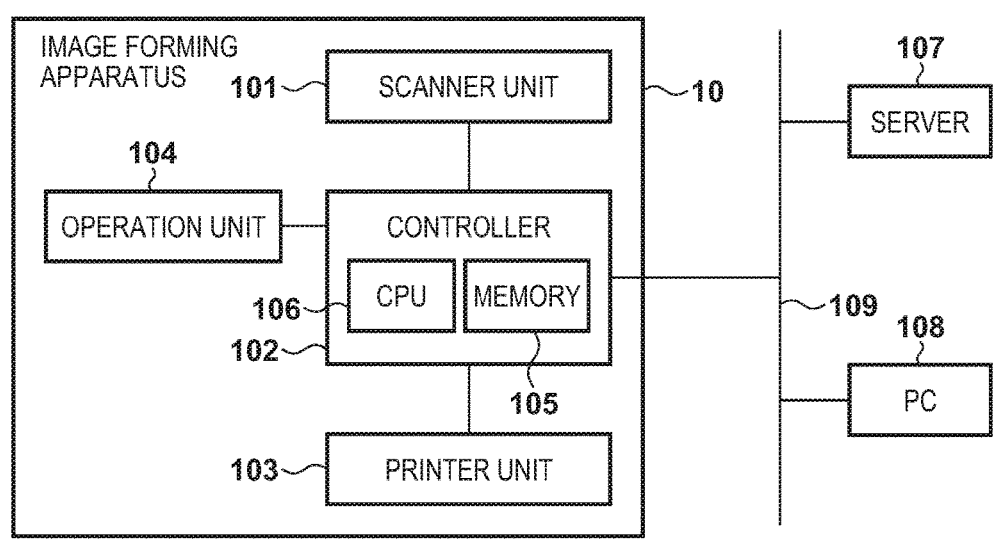
FIG. 1 is an overview block diagram of an image forming apparatus according to an embodiment.

Below, a description will be given of a first embodiment of the present invention. First, with reference to FIG. 1, an example of a hardware configuration of an image forming apparatus will be described. An image forming apparatus 10 is a digital multi-function peripheral having common functions for copying/printing/FAX, and the like.

The image forming apparatus 10 according to the present embodiment comprises a scanner unit 101 that performs original read processing and a controller 102 that applies image processing to image data read from the scanner unit 101, and stores the result in a memory 105 as image data for printing. Furthermore, the image forming apparatus 10 comprises an operation unit 104 for setting various print conditions for image data read by the scanner unit 101. Also, the image forming apparatus 10 comprises a printer unit 103 for performing image formation, in which image data for printing that was read from the memory 105, is visualized on a printing sheet in accordance with print setting conditions set by the operation unit 104. Also, a server 107 that manages image data and a personal computer (PC) 108 that is an external apparatus and that instructs the image forming apparatus 10 to execute printing are connected to the image forming apparatus 10 via a network 109.

FIG. 2 illustrates a cross-sectional view of an image forming apparatus. Here, a more detailed configuration and operation of the image forming apparatus 10 described with reference to FIG. 1 will be described with reference to FIG. 2. The image forming apparatus 10 has functions for each of copying, printing, and faxing. In FIG. 2, the image forming apparatus 10 according to the present embodiment comprises a scanner 201, a document feeder (DF) 202, and a printer 213 for print-recording and comprising drums for four colors.

First, a description of a read operation that is performed primarily by the scanner 201 will be given. In a case when an original is set on an original platen 207 and reading is performed, a user places an original on the original platen 207 and closes the DF 202. Then, after the original platen 207 being closed is detected by an open/close sensor 224, light-reflection type original document size detection sensors 226 to 230 in the housing of the scanner 201 detect the size of the original that was placed. Triggered by this size detection, a light source 210 irradiates the original, and a CCD (charge-coupled device) 231 receives light reflected from the original via a reflector 211 and a lens 212, and reads the image thereby. Also, the controller 102 of the image forming apparatus 10 converts image data read by a CCD 231 into a digital signal, image processing for the scanner is performed thereon, and the result is stored in memory in the controller 102 as image data for printing. Image data for printing at this time is configured by signals for three colors: red (R), green (G), and blue (B).

In a case when an original is set on the DF 202 and reading is performed, a user stacks an original in a tray of an original setting unit 203 of the DF 202 face-up. Then, a sensor for detecting the existence or absence of an original 204 detects that an original was set, the original is received and conveyed by an original feed roller 205 and a conveyance belt 206 rotating, and the original is set at a predetermined position on the original platen 207. After that, image data is read similarly to in a read operation in the original platen 207, and the obtained image data for printing is stored in the memory 105 in the controller 102.

When reading completes, the conveyance belt 206 again rotates, the original is fed to the right side in the cross-sectional view of the image forming apparatus of FIG. 2, and the original is discharged to an original discharge tray 209 via a conveyance roller 208 on the discharging side. In the case when there are a plurality of originals, a subsequent original is fed from the left side in the cross-sectional view of the image forming apparatus 10 via a paper feed tray 205 simultaneously to an original being conveyed from the original platen 207 to be discharged to the right side in the cross-sectional view of the image forming apparatus 10, and subsequent originals are consecutively read. The foregoing is operation of the scanner 201.

Next, a description of a print operation that is performed primarily by the printer 213 will be given. Image data for printing that is first stored in the memory 105 in the controller 102 is transferred to the printer 213, after image processing for printing that will be described later is performed in the controller 102, once again. In the printer 213, the image data is converted into recording laser beams in a laser recording unit corresponding to toner coloring material for four colors: yellow (Y), magenta (M), cyan (C), and black (K). Then, the recording laser beams are irradiated onto a photosensitive body 214 for each color, and an electrostatic latent image is formed on the surface of each photosensitive body. Then, the printer 213 develops an electrostatic latent image on each photosensitive body 214 by toner supplied from a toner cartridge 215. Visualized toner images on each photosensitive body 214 are primary transferred to an intermediate transfer belt 219. The intermediate transfer belt 219 rotates in a clockwise direction in FIG. 2, and, when a printing medium fed through a feed-conveyance path 217 from a sheet cassette 216 has reached a secondary transfer position 218, a toner image is transferred from the intermediate transfer belt 219 to the printing medium. The printing medium may be a memory medium on which an image is formed, such as a sheet.

The printing medium, to which an image is transferred, is discharged to a face-down center tray 221 or to a face-up side tray 222 after toner is fixed thereto by a fixing device 220 using pressure and heat, and the printing medium is conveyed through a discharge conveyance path. A flapper 223 switches the conveyance path in order to switch these discharge ports. In the case of double-sided print, after a printing medium passes through the fixing device 220, the flapper 223 switches the conveyance path, and by a switch-back thereafter, the printing medium is fed downward, and fed once again to the secondary transfer position 218 via a double-sided print sheet conveyance path 225, and thereby a double-sided print is performed.

<Image Processing>

Next, with reference to FIG. 3, image processing for printing described previously will be described in detail. FIG. 3 illustrates image processing for printing. Reference numeral 301 in FIG. 3 is an image processing unit for performing image processing for printing in the controller 102. In the present embodiment, a case in which each unit of the image processing unit 301 is realized by a hardware circuit, such as an ASIC is envisioned, but limitation is not made to this. A hardware circuit, such as an ASIC and a general-purpose processor may cooperate to realize the image processing on the image data for printing. Also, it is possible to realize image processing on image data for printing by the processor executing an image processing program. Here, the image data for printing that is first recorded on the memory 105 in the controller 102 is multi-tone data configured by 8-bit pixels, and each pixel has a 256 tone color number in the range of 0 to 255 as a pixel value.

Each pixel of the image data for printing inputted from the memory 105 is converted in a color conversion processing unit 302 from three colors (RGB) to four colors (CMYK) corresponding to the toner coloring materials. Normally, conversion results in density data that is brighter the larger an RGB value is and whose density is larger the larger a CMYK value is. The color conversion processing unit 302 outputs the converted image data to a gamma correction unit 303.

Next, the gamma correction unit 303 performs a gamma correction for each color, and outputs the corrected image data to a halftone processing unit 304. Finally, the halftone processing unit 304 applies later-described halftone processing for each color, converts from 8 bits to 1 bit halftone dot image data that can be printed by the printer 213, and sends the result to the printer unit 103.

Also, there is a processor (not shown) for controlling the image processing unit 301 in the controller 102, and by the processor, which is omitted in the figure, executing a control program, control parameters of the image processing unit 301 (for example, a threshold matrix used in the halftone processing, and the like) are set for a hardware circuit. The hardware circuit of the image processing unit 301 executes various image processing based on the set parameters. Also, the memory 105 is simultaneously used as a work region of a CPU 106. Also, a later-described threshold matrix is recorded in the memory 105 for each coloring material of the toner corresponding to CMYK. Note that in the present embodiment, the halftone processing unit 304 was described as outputting 1-bit halftone dot image data to the printer unit 103, but, in the case when the printer unit 103 performs multi-valued text printing using PWM control, or the like, there is no limitation to this. In such a case, a multi-valued threshold matrix is used in the halftone processing unit 304.

<Halftone Processing>

Next, with reference to FIG. 4A to FIG. 6F, operation of the halftone processing unit 304 in the image processing unit 301 and a threshold matrix that is used in halftone processing, and is for converting multi-tone image data into 2 tone image data, will be described. Here, a description is given by comparing characteristics of respective threshold matrices given a plurality of halftone dot growing orders as examples. FIG. 4A to FIG. 6F are examples of threshold matrices whose halftone dot growing orders differ though their 600 dpi halftone-dot ruling and angle are the same. The numerical values themselves in the threshold matrix are configured to be the same values in A to F of the same figure number, but shading is added to the values that are below a boundary that which differs for each of A to F. Specifically, an example is given in which respectively different densities are binarized. Normally different threshold matrices are used in order to have different halftone dot angles for each of the cyan, magenta, yellow, and black colors. In the present embodiment, a description is given using one color among those as an example.

FIG. 4A to FIG. 6F are all examples of binary threshold matrices that are applied to a predetermined color. In the matrices, halftone dot cells configured from a plurality of thresholds are arranged repetitively. A halftone dot cell corresponds to a submatrix including 4×4=16 pixels. The halftone processing unit 304 binarizes each pixel of image data into 2 tones having values of 0 to 1. The halftone processing unit 304 reads one threshold from a predetermined position of a matrix for each pixel. The halftone processing unit 304 performs binarization by comparing the read threshold and the value of the pixel, and, in a case when the pixel value exceeds the threshold outputting 1 and otherwise outputting 0. In other words, the larger the value (the darker the value) of a pixel, the more likely it is to exceed the threshold, and the greater the area in which a 1 is outputted to represent a dark image in terms of area, and, conversely, small values (having lighter pixel values) tend not to exceed the threshold, and so the area of 0s, which means white becomes larger. For the threshold matrices described in the present embodiment, a method that uses submatrices that combine a plurality of halftone dot cells with different thresholds is employed to obtain a sufficient tonal number (256 tones).

One halftone dot cell of the respective threshold matrices of FIG. 4A to FIG. 6F contains 16 thresholds, and 16 types of halftone dot cells having combinations of respectively different thresholds are arranged to be regularly lined up consecutively. Specifically, 4×4=16 submatrices are held in each threshold matrix. The entire threshold matrix is a 256 element array with 16 vertical columns and 16 horizontal rows, and the threshold matrix is repeatedly used so as to fill the pixel positions of image data in a tile form.

Figures 4A, 4B:
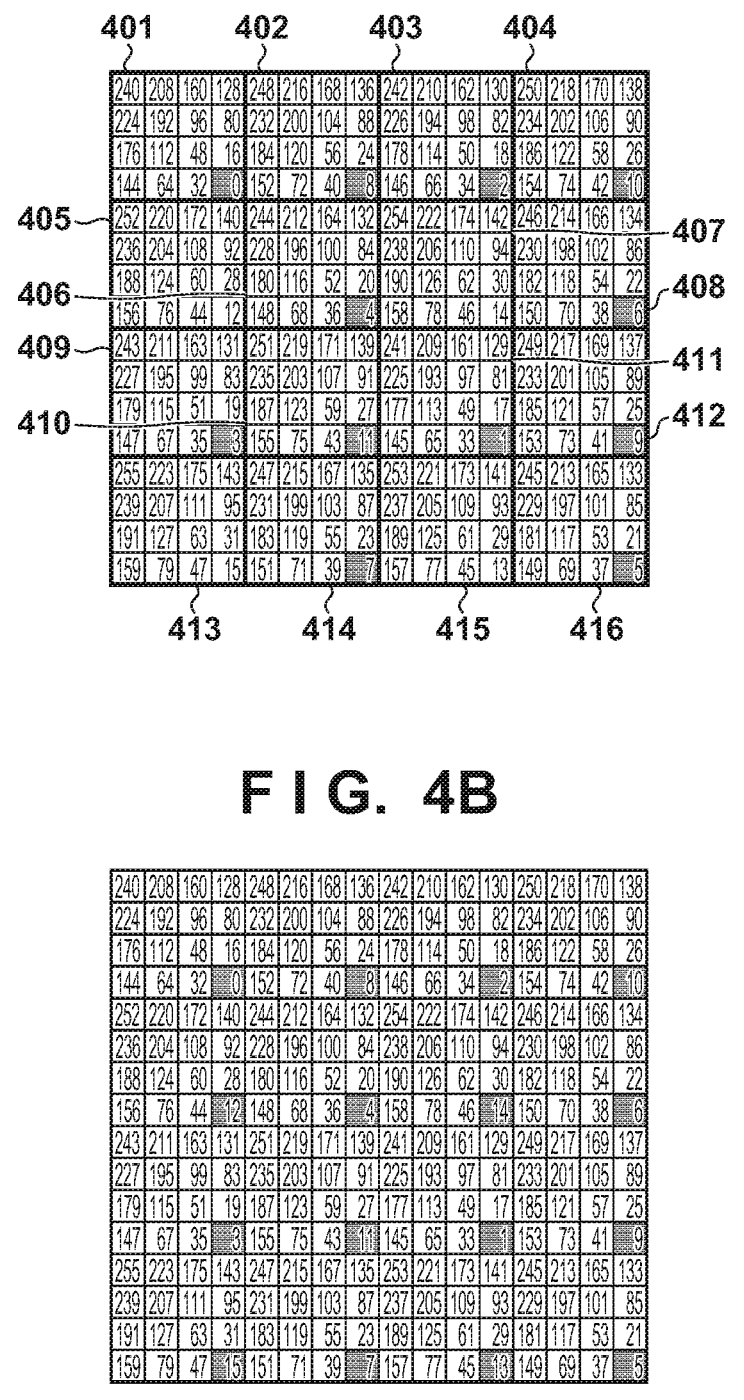

In the threshold matrix of FIG. 4A, halftone dots are formed in Bayer order: the halftone dot cells (submatrices) 401, 411, 403, 409, 406, 416, 408, 414, 402, 412, 404, 410, 405, 415, 407, and 413, where the order is from lower density ranges to higher density ranges. In this way, the threshold matrix is divided into a lattice of 4×4=16 submatrices. Because this threshold matrix is used repeatedly in the image, 401 is repeated on the right side of 404, and, similarly, 401 is repeated on the bottom of 413. Similarly, the threshold matrix illustrated in FIGS. 5A-5F is formed in Bayer order, and similarly used repetitively, detailed description will be given below for low density portions of small valued pixels (values 0-64) (hereafter, pixel values will be expressed as a density range) for which the difference in halftone dot growing order between FIG. 4A to FIG. 6F is particularly large.

The threshold matrix illustrated in FIGS. 4A-4D is for a normal AM screening example. In FIG. 4A, shading is added to locations where the threshold is less than 12. Specifically, in AM screening, the dots in the 16 submatrices gradually grow larger in order from the minimum dot. In the case of a threshold matrix, toner does not adhere to a printing medium easily when the halftone dots are small, and in particular, there is a problem that reproducibility and graininess of halftone dots of a low density range deteriorates.

Figures 4C, 4D:
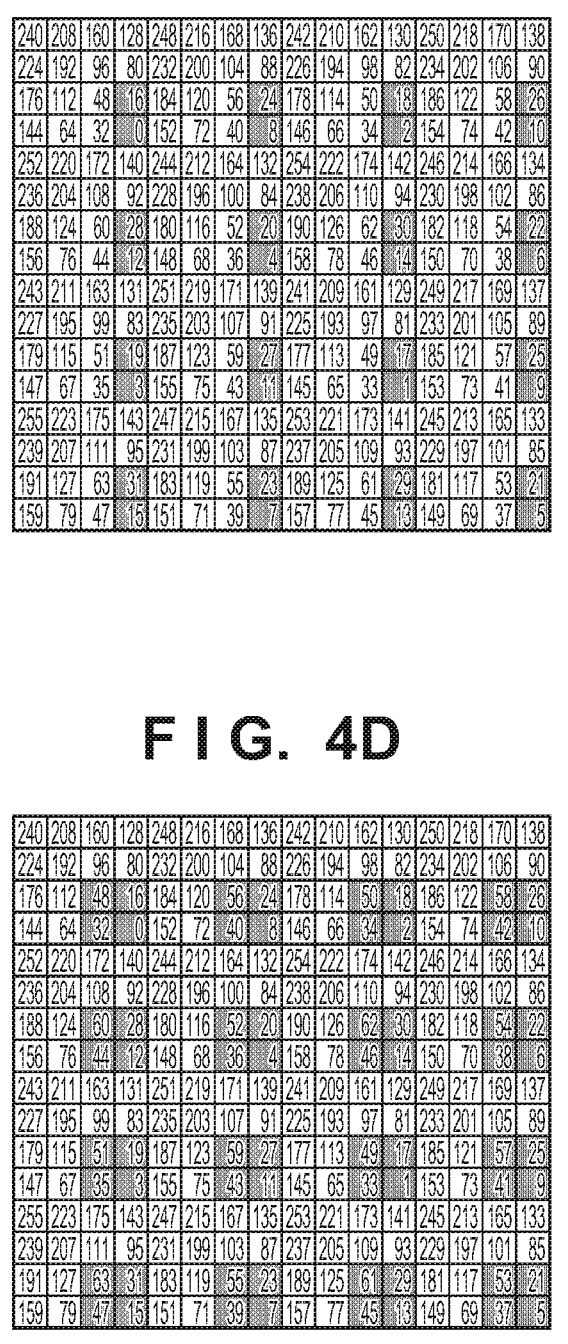

In FIGS. 4A-4D, specifically, while attempting to represent a density with isolated dots which are 1 dot out of 16 dots in a density range (FIG. 4B) with a density of 16 for the entire surface covering the threshold matrix, a situation where a density at which 1-dot isolated dots can be identified is not achieved. Similarly, a density is represented by isolated dots that are 2 out of the 16 dots in a density range of 32 (FIG. 4C), and a density is represented by isolated dots which are 4 out of the 16 dots in a density range of 64 (FIG. 4D). Normally a density that can be stably identified is achieved if the dots grow to be 4-dot isolated dots, and density instability in such a density range is low. Conversely, isolated dots up to this density range are accompanied by instability, and many problems can be said to exist with regards to stability of tonality in low density ranges up to a density of 64 for the normal AM screening threshold matrix illustrated in FIGS. 4A-4D.

Figures 5A, 5B, 5C:
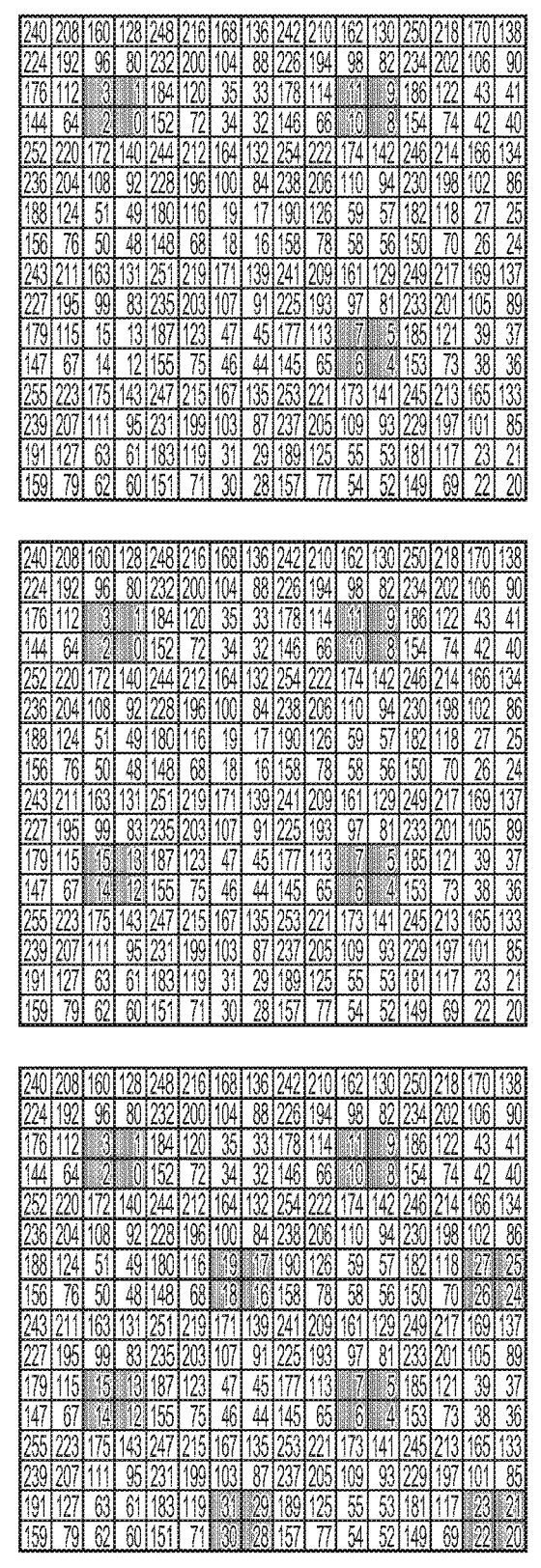
Figures 5D, 5E, 5F:
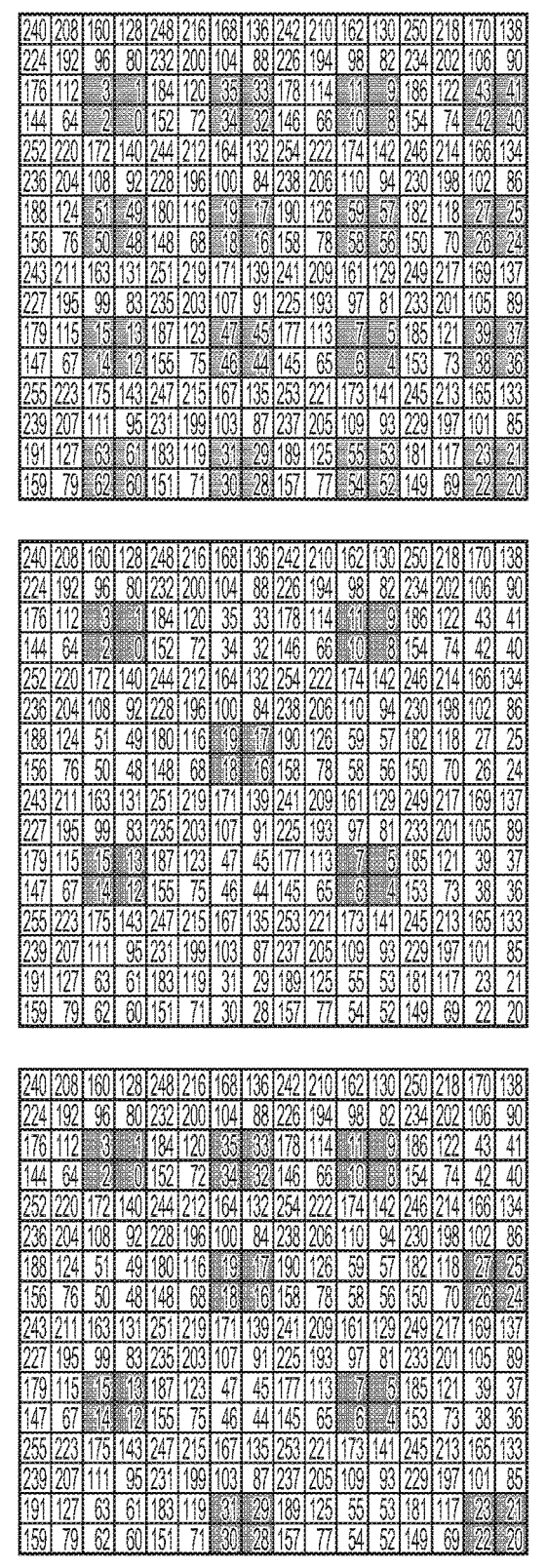

Next, the threshold matrix illustrated in FIGS. 5A-5F will be described. The threshold matrix illustrated in FIGS. 5A-5F compensates for the drawback of the AM screening illustrated in previously-described FIGS. 4A-4D, and is something that has enlarged the minimum isolated dots to a stable size (4 dots here). Similar to that shown in FIGS. 4A-4D, shading is added to locations where the threshold is less than 12 in FIG. 5A. As illustrated in FIG. 5A, in the threshold matrix of FIGS. 5A-5F, the matrix is defined so that one isolated dot is grown larger in order up to 4 dots in a density range up to 4, and the occurrence of unstable 1-dot isolated dots is thereby suppressed. Similarly in the density range of 16 (FIG. 5B), the density is represented by using four 4-dot isolated dots, and these dots are very different to in FIG. 4B. Similarly, a density is represented by using 8 4-dot isolated dots in a density range of 32 (FIG. 5C), and a density is represented by using 16 4-dot isolated dots in a density range of 64 (FIG. 5D). This completely matches the pattern of the threshold matrix illustrated in FIG. 4D in the density of 64, and the order of growth in subsequent density ranges completely matches that of FIGS. 4A-4D.

In the case of the threshold matrix illustrated in FIGS. 5A-5F, the problem of FIGS. 4A-4D is resolved, but, as described above, unnatural halftone dot texture repetition can be observed depending on the density range, and this leads to image quality degradation. Specifically, with the example of the density range of 20 (FIG. 5E), the density is represented by 5 4-dot isolated dots, but the cross shape of these 5 dots is repeated with a long cycle (a 16 pixel cycle), and the pattern tends to be visually noticeable. Similarly, even with the example of the density 12 as in FIG. 5A, repetition of 3 dot patterns is observed. Also, it is similar even in the density range of 36 represented by 9 dots (FIG. 5F) and the density range of 44 represented by 11 dots, and in the threshold matrix illustrated in FIGS. 5A-5F this point is a problem.

Finally, with reference to FIGS. 6A-6F, a characteristic threshold matrix according to the present embodiment will be described. The threshold matrix of FIGS. 6A-6F is a threshold matrix that compensates for the drawbacks of FIGS. 4A-4D and FIGS. 5A-5F. Also, in FIG. 6A, the submatrices 601 to 616 that respectively have 4×4=16 dots are illustrated. Similar to that shown in FIGS. 4A-4D, shading is added to locations where the threshold is less than 12 in FIG. 6A.

Figures 6A, 6B, 6C:
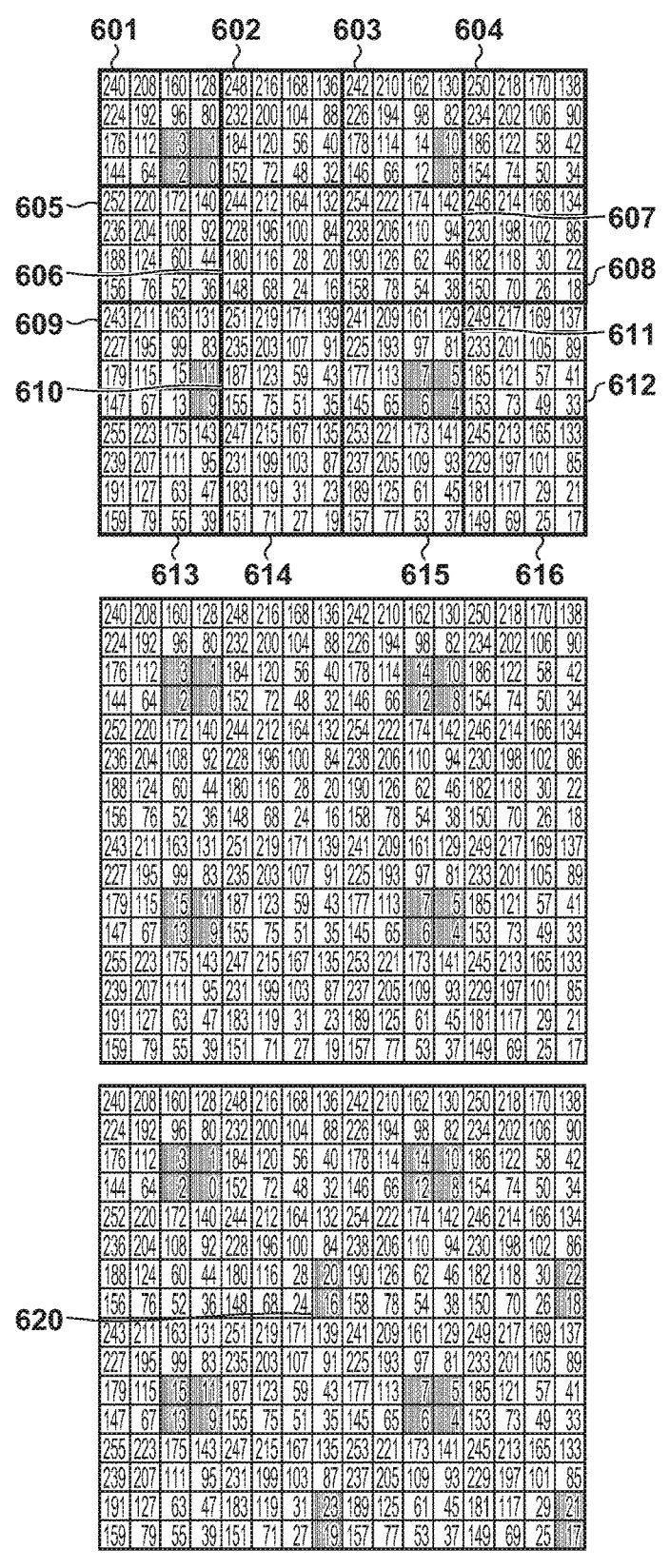
Figures 6D, 6E, 6F:
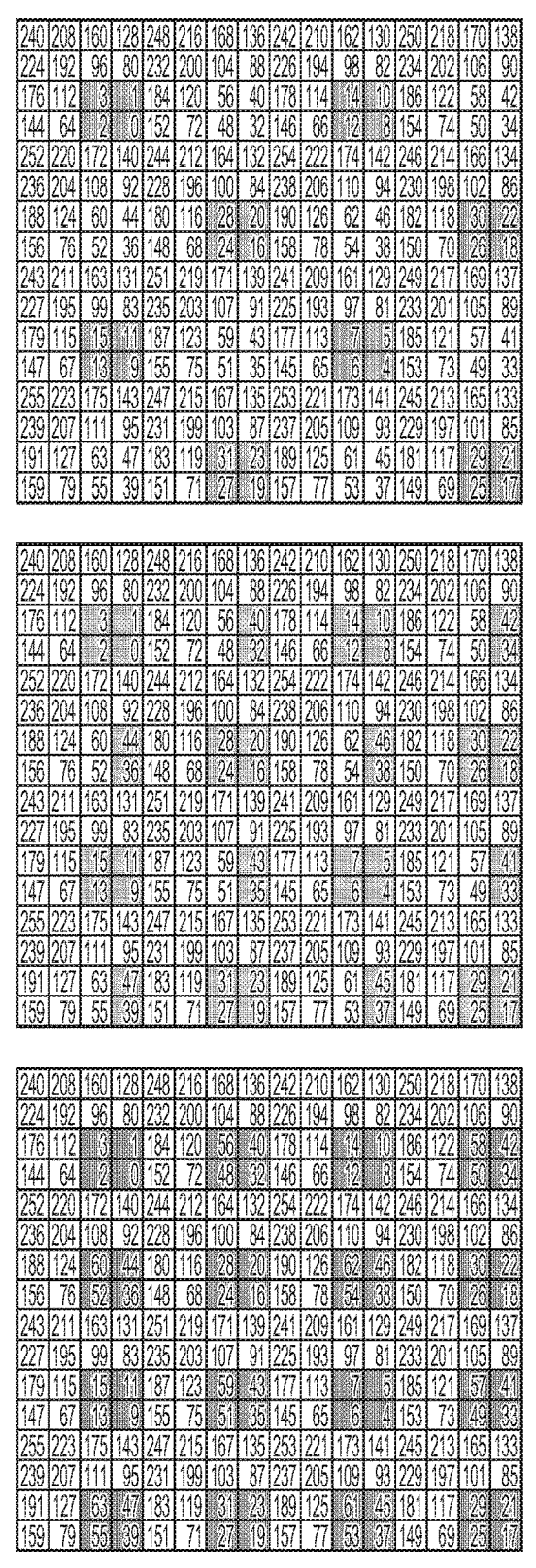

As illustrated in FIG. 6A, isolated dots of a required number are placed at locations where a maximum cycle can be realized in the lattice so that a texture is difficult to see, while configuring the size of isolated dots so be the stable 4 dots (a first dot size) similarly to in FIGS. 5A-5F. For example, up to the density range 8 is a complete match with that of FIGS. 5A-5F, and 4-dot isolated dots are used for the submatrix 601 and the submatrix 611. Meanwhile, in the density range 9 to 15, two halftone dots are respectively grown consecutively in different submatrices 603 and 609, and completely match with FIG. 5B in the density range 16 (FIG. 6B). In the density 12 illustrated in FIG. 6A, density is represented by a lattice of 2 4-dot isolated dots and 2 2-dot isolated dots. When growth as per FIGS. 5A-5F is performed in the 9 to 15 density range, at the point where a third halftone dot is created, specifically, when an L-shaped repeating pattern with a 16 pixel cycle is created as in FIG. 5A in the density range 12, an unnatural halftone dot texture appears.

In contrast to this, by consecutively growing 2 dots (a second dot size) in different submatrices as in FIG. 6A, a lattice, like a go board, in which this pattern is difficult to observe, can be created while making this cycle an 8 pixel period, which is double this. The cycle of the lattice is a double root cycle compared to a case where 2 halftone dots are used (the density range 8). Subsequently, this is repeated, and 4 halftone dots are grown consecutively in the submatrices 606, 608, 614, and 616 in the density range of 17 to 31 (FIG. 6(c)), and in the density range 32 (FIG. 6D) it matches FIG. 5C completely, and the lattice cycle becomes short. After that, in the density ranges of 33 to 63 (FIG. 6E), 8 halftone dots are simultaneously grown in the submatrices 602, 604, 605, 607, 610, 612, 613, and 615. After that, in the density range 64 (FIG. 6F), there are 16 4-dot isolated dots, and it completely matches FIG. 5D and FIG. 4D. In density ranges thereafter, similar to that shown in FIGS. 5A-5F, the growth order completely matches FIGS. 4A-4D. In this way, by generating a threshold matrix so as to prioritize laying out halftone dots in a lattice like a go board in relation to making the size of an isolated dot be 4 dots, it is possible to improve reproducibility of halftone dots in low density ranges and to suppress the occurrence of unnatural halftone dot textures.

<Threshold Matrix Generation>

Next, with reference to FIG. 7, a processing procedure for generating the threshold matrix of FIGS. 6A-6F according to the present embodiment will be described. Processing for generating the threshold matrix is performed in advance of image processing, and is performed asynchronously to the processing in the apparatus described in FIG. 2 and FIG. 3. The processing described below is realized by, for example, the CPU of the information processing apparatus, which is the server 107 or a PC 108, or the like, reading a control program stored in advance in an HDD (not shown) into a RAM (not shown), and executing the control program. Also, the present invention is not limited to this, and processing for generating the threshold matrix may be executed by the image forming apparatus 10. In such a case, the processing described below is realized by, for example, the CPU 106 reading a control program stored in advance in the memory 105 of the image forming apparatus 10, and executing it.

Here, let S be, for example, a 4-dot isolated dot size (first dot size), which is a size at which halftone dots are stably formed in a low density range. Also, a description is given with an example in which, from a state in which n-th halftone dots have been laid out in a lattice form, processing for determining the positions and number of (n+1)-th halftone dots is executed recursively. Also, a threshold matrix is used repetitively in a tiled form for a lattice-like layout of halftone dots. Also, after a halftone dot of size S has been generated in all submatrices, it is determined that the density is outside of the extreme density range, and normal AM growth is performed. Thus, processing subsequent to the flow is omitted.

First, in step S701, the CPU initializes a simultaneous growth number (predetermined number) M for halftone dot growth to be a predetermined value m, and initializes n which indicates a halftone dot to be 1. In the case of the threshold matrix exemplified in FIGS. 6A-6F, since M is the initial number of isolated dots it is initialized to 1. In other words, M indicates the number of submatrices in which to grow halftone dots simultaneously. Next, in step S702, the CPU adds a dot for the M n-th halftone dots, and sets the thresholds so that the sizes of the halftone dots become larger. Specifically, the CPU sets thresholds in positions adjacent to the halftone dot in order from smallest to largest number. Here, no dot is added to a halftone dot for which the size S has already been reached, and a dot is added to a halftone dot for which the size S has not been reached yet. Note that adding a dot means adding to the halftone dot one of the 4×4=16 dots that are included in a single submatrix, and increasing by 1 the shaded component of the submatrix in FIGS. 6A-6F, for example.

Next, in step S703, the CPU confirms whether or not the size of all M halftone dots has reached the predetermined size S due to the dot added in step S702, and if the size S has not been reached, returns the processing to step S702 to add a dot. Meanwhile, when the size of all M halftone dots is determined to have become S, the processing advances to step S704, and the CPU confirms whether or not the halftone dot size has become S in all submatrices. If the size of halftone dots of all submatrices has become S, the processing advances to step S708, and the CPU generates the threshold matrix such that normal AM growth for halftone dots in subsequent densities is performed, and the processing is ended.

Meanwhile, in the case when the halftone dots have not become the size S in all submatrices in step S704, the processing advances to step S705. In step S705, the CPU sets dot starting positions for next halftone dots to center positions between halftone dots of the lattice generated thus far. Here, the intersection point of the diagonal lines of a square configured by 4 dots that form 1 square in the lattice is defined as a center position. For example, the dot 620 (the threshold "16") illustrated in FIG. 6C becomes the center position of the 4 halftone dots, illustrated in FIG. 6B, that were each formed with 4 dots.

Next, in step S706, the CPU counts how many dots there are in the threshold matrix for next halftone dot starting positions (center positions as described above) obtained in step S705, and updates M by the counted number. When using this center position definition, the density of the lattice increases to be double, and, therefore, the M value for n+1 is twice the M value of n. Next, in step S707, the CPU increments the value of n, returns the processing to step S702, and repeats the above-described processing. Note that, as described using FIGS. 6A-6F, when M>=2, the size at which consecutive growth is performed in one submatrix is a second dot size (for example, 2 dots), which is smaller than the first size (for example, 4 dots).

To give a specific description that is applied to the threshold matrix described in FIGS. 6A-6F, initialization to M=1 is performed in step S701, and the submatrix 601 is made to be the first, and its halftone dot is grown until its size is 4 (thresholds 0 to 3). Then, in step S705, assuming that the threshold table (including 4×4=16 submatrices) is repeated, the submatrix 611, which is at the midpoint between 601s, is made to be the next halftone dot position, the setting M=1 is performed, and the second halftone dot is enlarged toward the size 4 (thresholds 4 to 7). Similarly, for the third halftone dot position, M=2 for the two dots of the submatrices 603 and 609, which are the midpoints of 601 and 611 submatrices. Because the number of submatrices for which halftone dots are grown simultaneously is 2 in the case when M=2, when a dot of the submatrix 603 (threshold 8) is grown, a dot of the submatrix 611 (threshold 9) is grown next, as illustrated in FIG. 6A, for example. After that, again, a dot of the submatrix 603 (threshold 10) is grown, and the alternating growth continues until the size of each of the halftone dots becomes 4. n, M, and the halftone dot positions that are grown at that time transition as follows. n=1, M=1, 601; n=2, M=1, 611; n=3, M=2, 603, 609; n=4, M=4, 606, 616, 608, 614; n=5, M=8, 602, 612, 604, 610, 605, 615, 607, 613. In this way, it can be seen that when n>=2, the value of M for n+1 is twice the value of M for n. Note that the processing of step S702 in the case when M=1 corresponds to the processing of a first determination unit, and the processing of step S702 when M>=2 corresponds to the processing of a second determination unit. Also, the processing of step S703 to step S706 is one example of the processing of a setting unit.

As described above, the present embodiment is related to an information processing apparatus, a threshold matrix generation method, and a program therefor that generate a threshold matrix, which includes a plurality of submatrices divided into a lattice form and is for converting multi-tone image data into 2-tone image data. The information processing apparatus, in accordance with rising density in a low density range, determines a threshold for setting each pixel of the threshold matrix so as to consecutively grow an isolated dot corresponding to a halftone dot in a low density range to a first dot size for each submatrix. Also, when the information processing apparatus grows the size of isolated dots in a predetermined number of submatrices to the first dot size, the information processing apparatus sets an intermediate position between the isolated dots in the predetermined number of submatrices. Furthermore, the information processing apparatus, for each of one or more submatrices including a set intermediate position, determines a threshold to set for each pixel of the threshold matrix so that an isolated dot is consecutively grown until a second dot size smaller than the first dot size. Using these determined thresholds, the threshold matrix is generated. Consequently, by virtue of the present embodiment, it is possible to realize improvement of reproducibility and graininess of halftone dots in a low density range while restraining the size of the threshold matrix needed for processing, and suppressing unnatural textures of halftone dots.

Note that in the present embodiment, using the example of halftone dots with a 0 degree angle, squares in a lattice, and midpoint positions thereof were described as the threshold matrix, but it is possible to similarly implement an angle in the halftone dots. Also, in the present embodiment, an example was described using one color, but it is possible to apply this processing to all of the colors in CMYK, and it is possible to apply the processing to only a color for which a halftone dot texture is easily observed (for example, black). Also, in the present embodiment, squares in a lattice were described using an example of a square that is perpendicular in vertical and horizontal distances, but it is possible to obtain a center position in rectangular, rhombus, or parallelogram shapes as well, and it is possible to implement the embodiment similarly for such lattices as well. Also, an intersection point between diagonal lines of 4 vertices was made to be a next halftone dot position, but there is no limitation to this if it is a position near the intersection point for which a texture of a low cycle tends not to appear. Also, in the present embodiment, a configuration in which the information processing apparatus generates a threshold matrix is described, but it goes without saying that the threshold matrix may be generated on an image forming apparatus that actually uses it.

Second Embodiment

Below, a description will be given of a second embodiment of the present invention. In the above-described first embodiment, a configuration in which, by a threshold matrix, halftone dot reproducibility is improved in low density portions and halftone dot textures are suppressed, was described. However, even in high density portions, a collapse may occur due to the hole being too small in a hole portion that is filled by halftone dots, and tonality degradation in a high density portion may occur. Accordingly, in the present embodiment, a configuration in which, similarly to in the first embodiment, the size of holes in a high density portion is kept at a fixed size, and the occurrence of a halftone dot texture due to the holes is suppressed, will be described.

Note that a description regarding a configuration of an image forming apparatus that is similar to the above-described first embodiment, an apparatus overview, and explanation of overlapping procedures in the flow will be omitted, and a description will be given for a characteristic point of halftone processing, and, in particular, for a threshold matrix that is used in the halftone processing. Also, points that overlap in the description of the threshold matrix and the description of the foregoing first embodiment will be omitted.

<Halftone Processing>

With reference to FIGS. 8A-8F and FIGS. 9A-9F, a description will be given of operation of the halftone processing unit 304 of the image processing unit 301 and an example of an order in which a plurality of halftone dots are grown for a threshold matrix that is used in halftone processing. Similar to that shown in FIGS. 4A-4D, which was described in the foregoing first embodiment, FIGS. 8A-8F, and FIGS. 9A-9F are examples of threshold matrices whose halftone dot growing orders differ though their 600 dpi halftone-dot ruling and angle are the same. FIGS. 8A-8F and FIGS. 9A-9F, similar to that shown in FIGS. 4A-4D, are both examples of binary threshold matrices that are applied to a predetermined color. The halftone processing unit 304 reads one threshold from a predetermined position of a matrix for each pixel. The halftone processing unit 304 performs binarization by comparing the read threshold and the value of the pixel, and outputting 1 in a case when the pixel value exceeds the threshold, and, otherwise outputting 0.

One halftone dot cell of the threshold matrices of FIGS. 8A-8D to FIGS. 9A-9F contains 16 thresholds, and 16 types of halftone dot cells having combinations of respectively different thresholds are arranged to be regularly lined up consecutively. Specifically, 4×4=16 submatrices are held in this threshold matrix. The entire threshold matrix is a 256 element array with 16 vertical columns and 16 horizontal rows, and the threshold matrix is repeatedly used so as to fill the pixel positions of image data in a tile form. For the respective halftone dot growing orders illustrated in previously described FIGS. 4A-4D, in FIGS. 8A-8F, and FIGS. 9A-9F, a detailed description will be given for particularly large valued pixel values and the high density portion of 192 to 255.

First, the threshold matrix illustrated in FIGS. 4A-4D, as described above, is for a normal AM screening example. Specifically, in order from the minimum dot, dots in the halftone dot cells included in all of the submatrices grow larger in order. However, in the density range of 240, which is a higher density, a density in which only 1 of the 16 dots in each submatrix is an isolated blank (isolated blank dot) is to be represented, but there are cases in which density cannot represented because the isolated 1-pixel blank collapses due to the surrounding density. In other words, it is a reversal of the blacks and whites of the low density portion of FIG. 4A described in the foregoing first embodiment. Similarly, 2 out of 16 pixels are isolated blanks in the 224 density range, and 4 out of 16 dots are isolated blanks in the 192 density range. As described in the above-described first embodiment, there are more problems for isolated blanks with regards to stability of tonality in high density ranges when a blank area that lacks a certain size collapses and the density cannot be represented.

Figures 8A, 8B, 8C:
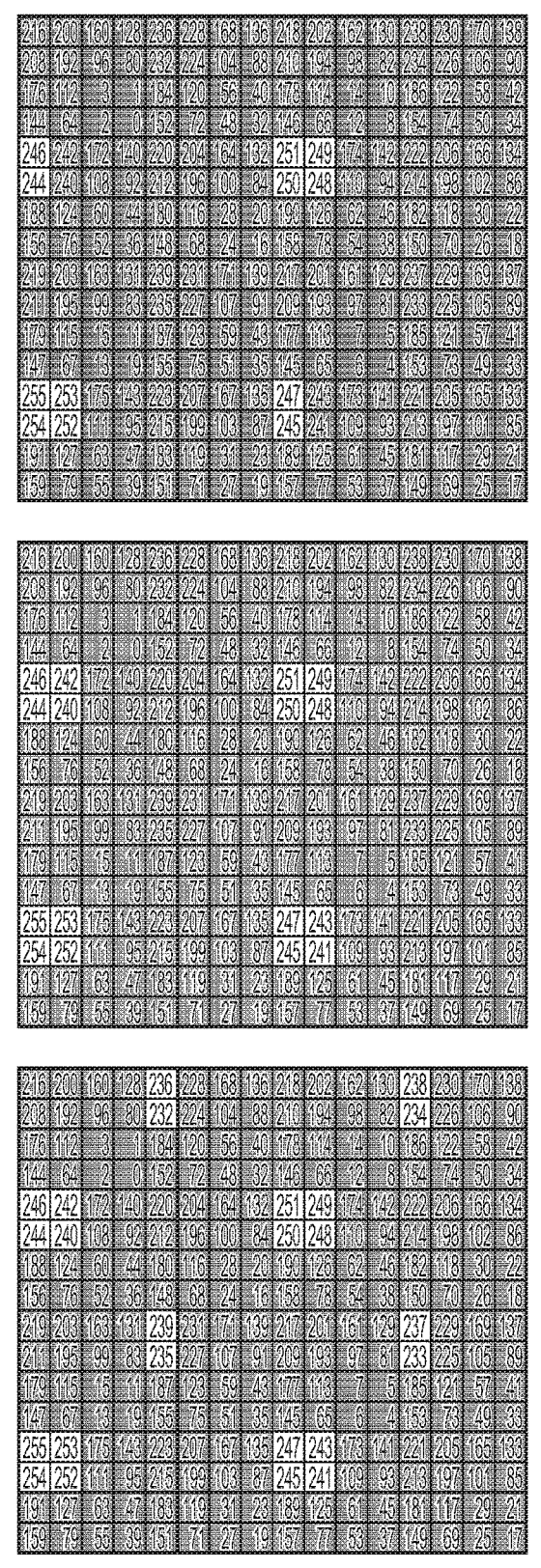
Figures 8D, 8E, 8F:
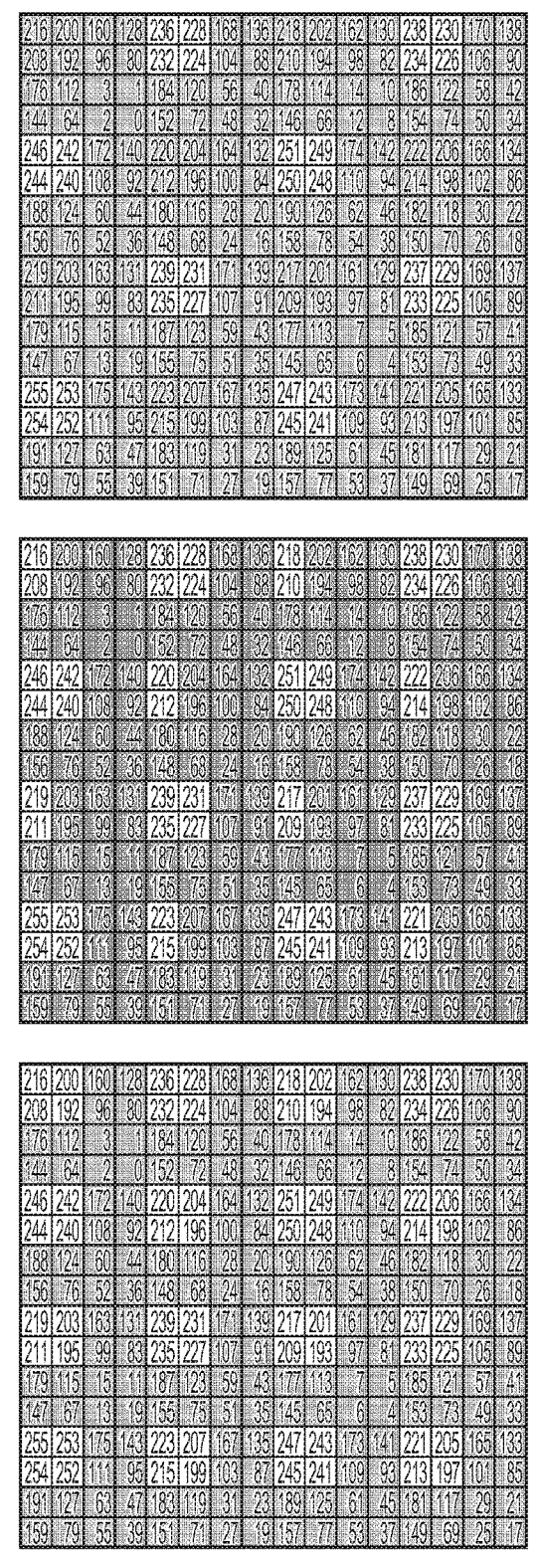

The threshold matrix illustrated in FIGS. 8A-8F compensates for the drawback of the AM screening in high density range illustrated in the previously-described FIGS. 4A-4D, and makes a minimum isolated blank a stable size large enough to not collapse. In FIG. 8A, shading is added to locations where the threshold is less than 244. Specifically, the blacks and whites are a reversal of the low density portion illustrated in FIG. 6A. As described in the above-described first embodiment, by increasing the size of isolated blanks to up to 4 dots, stability of tonality in a high density portion is enhanced, and the occurrence of an unnatural halftone dot texture due to isolated blank layout becoming lattice-like is suppressed. In FIG. 8B, shading is added to locations where the threshold is less than 240. Similarly, for FIG. 8C, shading is added for thresholds less than 232, and in FIG. 8D, shading is added for thresholds less than 224. The blacks and whites are a reversal of what was described using FIGS. 6A-6F, and 4-dot isolated blanks repeat in a lattice-like form. Through FIG. 8E in which shading is added for thresholds less than 208, a lattice of 4-dot isolated blanks is formed in FIG. 8F where shading is added for thresholds less than 192, and in lower density ranges than this, the size of the blank areas gradually becomes larger. Also, by combining with the above-described first embodiment, as described using FIGS. 6A-6F, an isolated dot of a low density portion can be made to be 4 dots, and stable tonality can be realized in both high and low density ranges.

<Variation>

The threshold matrix illustrated in FIGS. 9A-9F is a variation of the present embodiment illustrating an example in which the size of the isolated blanks is made to be 2 dots in contrast to the threshold matrix illustrated in FIGS. 8A-8F. Typically, small dots being difficult to represent in a low density portion means that regions desired to be represented by 1 being outputted as the result of threshold processing tend to shrink when ultimately outputted onto the sheet. As a result, small dots disappear. For high density portions, conversely, there is a tendency for portions with an isolated blank to not collapse, and so the characteristics of isolated blanks and isolated dots for high density portions and low density portions have opposite tendencies. In other words, it is more typical that the size of an isolated dot in a low density portion and the size of an isolated blank in a high density portion do not match.

Figures 9A, 9B, 9C:
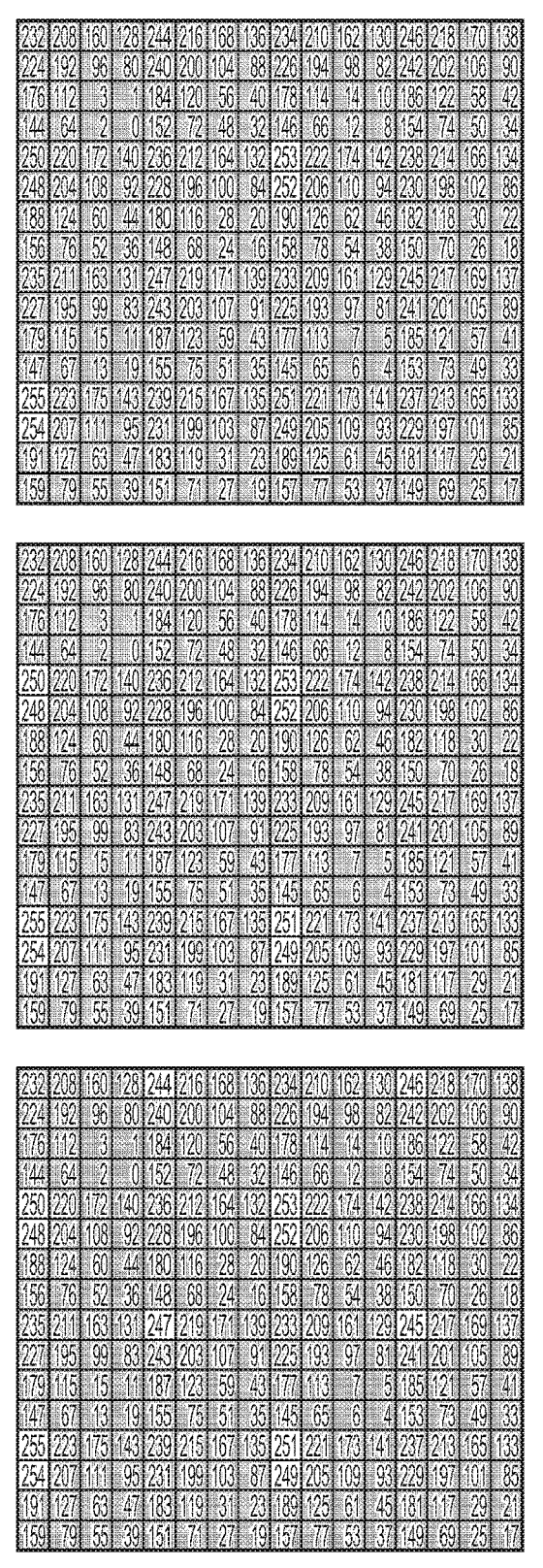
Figures 9D, 9E, 9F:
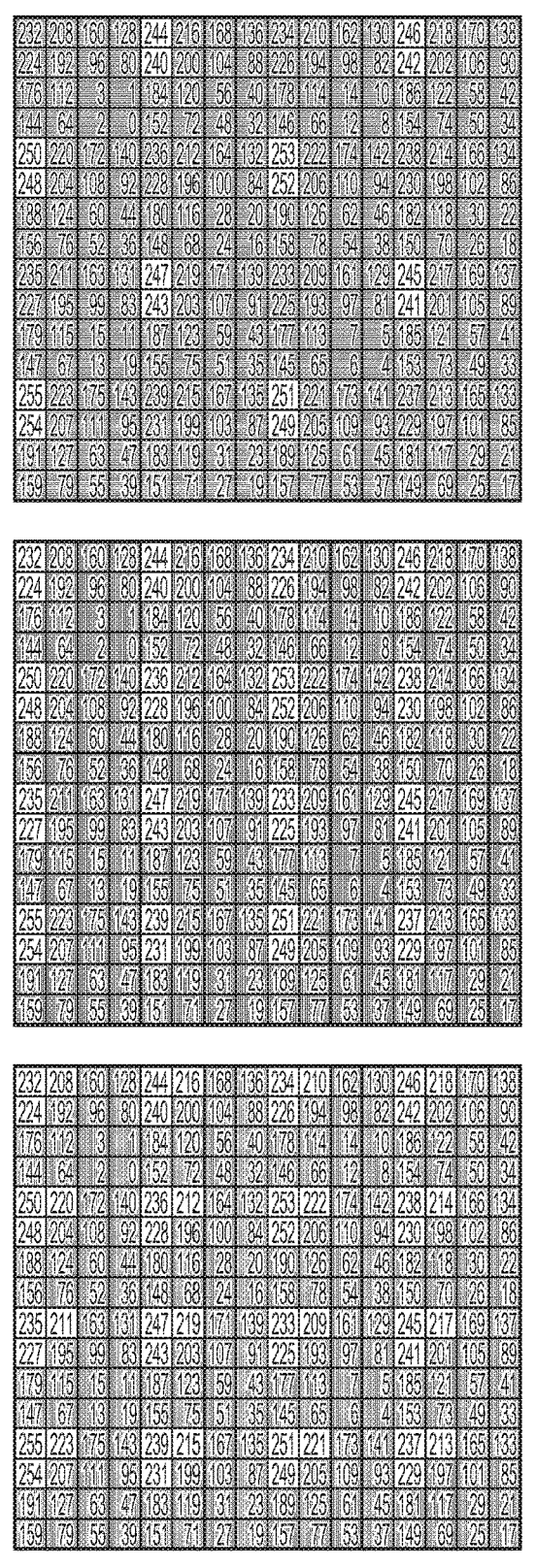

Accordingly, FIGS. 9A-9F is an example in which a size of 4 dots for an isolated dot of a low density portion and a different size of 2 dots for an isolated blank of a high density portion are used specifically. In FIG. 9A, shading is added to locations where the threshold is less than 252. This lattice according to the 2-dot isolated blanks changes into the lattice of FIG. 9B, and the lattice of FIG. 9D is formed through a state in which 4 2-dot isolated blanks and 4 1-dot isolated blanks of the density range 244 of FIG. 9C are laid out. After forming a highest density lattice as in FIG. 9E, lower densities are realized by increasing the size of the isolated blanks by 1 dot at a time as in FIG. 9F. On a digital image, the sizes of the 4 isolated dots on the low density side and the 2 isolated dots on the high density side are different, but the sizes that are ultimately outputted on the sheet can be expected to be approximately the same. Of course, it is necessary to adjust the dot sizes on the low density side and high density side in advance so that the sizes on the sheet are the same. In other words, the threshold matrix illustrated in FIGS. 9A-9F is generated so as to adjust the smallest dot size in the low density range and the high density range (in other words, extreme density ranges) to match the specification and characteristics of the image forming apparatus to be used.

Figure 7:
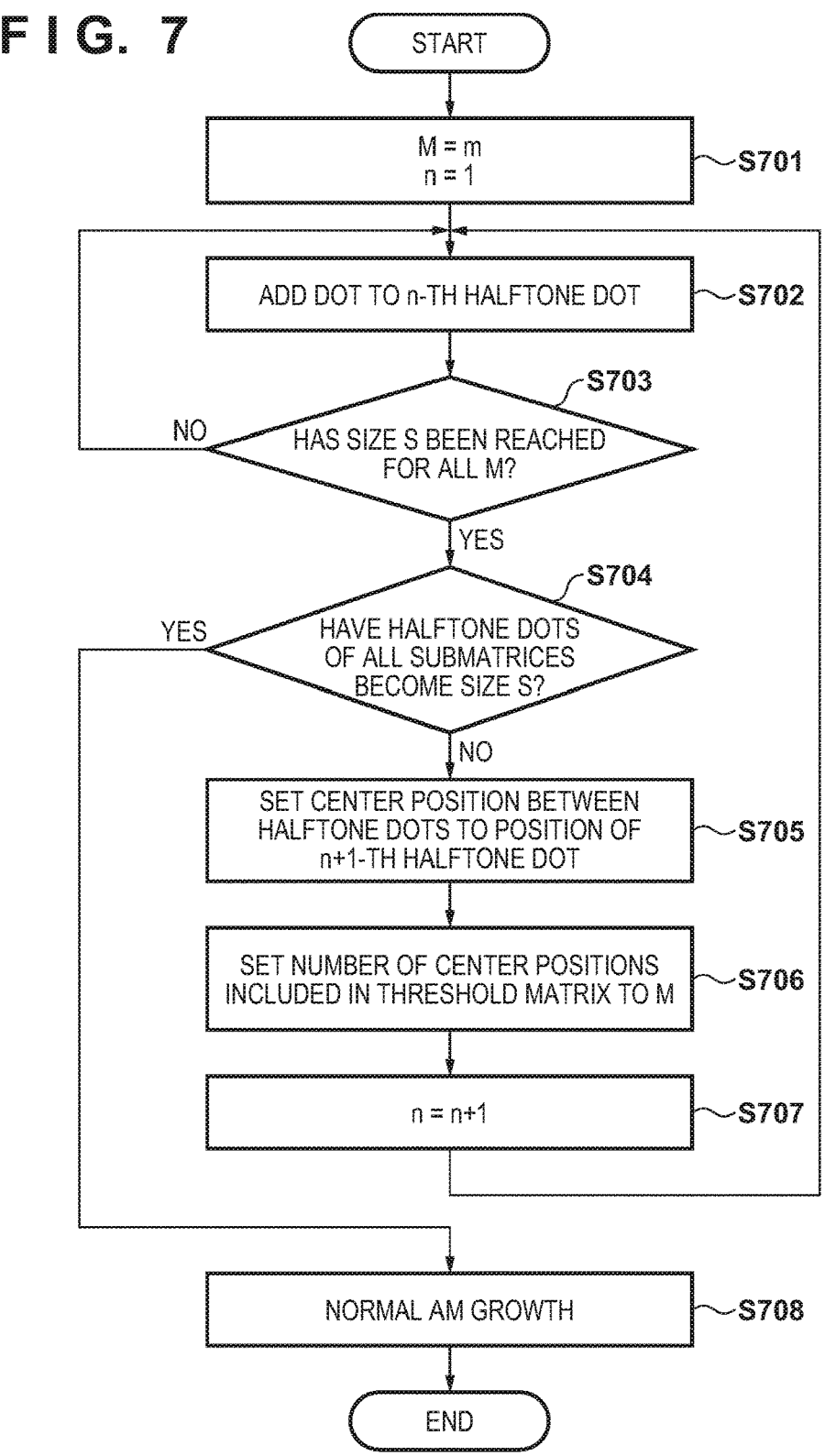
FIG. 7 is a flowchart that illustrates a processing procedure for generating a threshold matrix according to an embodiment.

Note that, for the flows for generating the threshold matrices illustrated in FIGS. 8A-8F and FIGS. 9A-9F, the only difference with respect to the flow described using FIG. 7 in the foregoing first embodiment is whether it is processing for locations where the threshold processing result is 1 or processing for locations where the threshold processing result is 0. Accordingly, a detailed description thereof is omitted.

As described above, the present embodiment is related to an information processing apparatus, a threshold matrix generation method, and a program therefor that generate a threshold matrix, which includes a plurality of submatrices divided into a lattice form and is for converting multi-tone image data into 2-tone image data. The information processing apparatus, in accordance with dropping density in a high density range, determines a threshold for setting each pixel of the threshold matrix so as to consecutively grow an isolated blank dot corresponding to a blank area hole in a high density range to a first dot size for each submatrix. Also, when the information processing apparatus grows the size of the isolated blank dots in a predetermined number of submatrices to the first dot size, the information processing apparatus sets an intermediate position between the isolated blank dots in the predetermined number of submatrices. Furthermore, the information processing apparatus, for each of one or more submatrices including a set intermediate position, determines a threshold to set for each pixel of the threshold matrix so that an isolated blank dot is consecutively grown until a second dot size smaller than the first dot size. Using these determined thresholds, the threshold matrix is generated. Consequently, by virtue of the present embodiment, it is possible to improve reproducibility of halftone dots, not only in a low density ranges, but also, in high density ranges, and to suppress the occurrence of irregular low cycle halftone dot textures with the same threshold matrix size as is used in normal AM screening.

OTHER EMBODIMENTS

Embodiment(s) of the present invention can also be realized by a computer of a system or an apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A method of generating a threshold matrix that includes a plurality of submatrices divided into a lattice form and is for converting multi-tone image data into image data of a lower number of tones, the method comprising:
   determining, in accordance with rising density in an extreme density range, a threshold for setting each pixel of the threshold matrix so as to consecutively grow an isolated dot corresponding to a halftone dot in a low density range to a first dot size for each submatrix;
   setting, when the size of isolated dots in a predetermined number of submatrices is grown to the first dot size, an intermediate position between the isolated dots in the predetermined number of submatrices;
   determining, for each of one or more submatrices including the set intermediate position, a threshold to set for each pixel of the threshold matrix so that an isolated dot is consecutively grown until a second dot size smaller than the first dot size; and
   generating the threshold matrix by using the determined thresholds.

2. The generation method according to claim 1, wherein the first dot size is a size at which a halftone dot is stably formed in a low density range.

3. The generation method according to claim 2, wherein the first dot size is determined separately for a dot size in a lower density range and a dot size in a higher density range in accordance with a characteristic of an image forming apparatus for executing image formation using the threshold matrix.

4. The generation method according to claim 1, wherein, in the generating,
   the threshold matrix is generated by determining a threshold for each pixel so that the isolated dots are grown in order one dot at a time for each submatrix in accordance with rising density outside of an extreme density range.

5. A non-transitory storage medium storing a program for causing a computer to execute each step of a method of generating a threshold matrix that includes a plurality of submatrices divided into a lattice form and is for converting multi-tone image data into image data of a lower number of tones, the method comprising:
   determining, in accordance with rising density in an extreme density range, a threshold for setting each pixel of the threshold matrix so as to consecutively grow an isolated dot corresponding to a halftone dot in a low density range to a first dot size for each submatrix;
   setting, when the size of isolated dots in a predetermined number of submatrices is grown to the first dot size, an intermediate position between the isolated dots in the predetermined number of submatrices;
   determining, for each of one or more submatrices including the set intermediate position, a threshold to set for each pixel of the threshold matrix so that the isolated dot is consecutively grown until a second dot size is smaller than the first dot size; and
   generating the threshold matrix by using the determined thresholds.

6. The storage medium according to claim 5, wherein the first dot size is a size at which a halftone dot is stably formed in a low density range.

7. The storage medium according to claim 6, wherein the first dot size is determined separately for a dot size in a lower density range and a dot size in a higher density range in accordance with a characteristic of an image forming apparatus for executing image formation using the threshold matrix.

8. The storage medium according to claim 5, wherein, in the generating,
   the threshold matrix is generated by determining a threshold for each pixel so that the isolated dots are grown in order one dot at a time for each submatrix in accordance with rising density outside of an extreme density range.

9. A non-transitory storage medium storing a program for causing a computer to execute each step of a method of generating a threshold matrix that includes a plurality of submatrices divided into a lattice form and is for converting multi-tone image data into image data of a lower number of tones, the method comprising:
   determining, in accordance with falling density in an extreme density range, a threshold for setting each pixel of the threshold matrix so as to consecutively grow an isolated blank dot corresponding to a blank area hole in a high density range to a first dot size for each submatrix;
   setting, when the size of the isolated blank dots in a predetermined number of submatrices is grown to the first dot size, an intermediate position between the isolated blank dots in the predetermined number of submatrices;

determining, for each of one or more submatrices including the set intermediate position, a threshold to set for each pixel of the threshold matrix so that the isolated blank dot is consecutively grown until a second dot size is smaller than the first dot size; and generating the threshold matrix by using the determined thresholds.

10. An image forming apparatus comprising:
(A) a memory configured to store a threshold matrix for executing halftone processing for converting a multi-tone input image data into output image data of a lower number of tones;
(B) a controller unit comprising a processor for executing a program or a hardware circuit; and
(C) a printing device,
wherein the controller unit:
(a) uses the threshold matrix stored in the memory to execute halftone processing in relation to the input image data, and to generate output image data;
(b) controls the printing device to cause the printing device to print on a sheet an image based on the output image data,
wherein the threshold matrix has a plurality of submatrices,
and, in a case when screen processing is executed in relation to input image data configured by a first density: (1) for a first submatrix, thresholds are arranged so that a dot of a first size is outputted; (2) for a second submatrix, thresholds are arranged so that, in a case when screen processing is executed in relation to a region of the first density, a dot of a second size smaller than the first size is outputted; and (3) for a third submatrix and a fourth submatrix, thresholds are arranged so that, in a case when screen processing is executed in relation to a region of the first density, a dot is not outputted, and, in a case when screen processing is executed in relation to input image data configured by a second density that is higher than a first density: (4) for the first submatrix and the second submatrix, thresholds are arranged so that a dot of the first size is outputted; (5) for a third submatrix, thresholds are arranged so that a dot of the second size is outputted; and (6) for a fourth submatrix, thresholds are arranged so that a dot is not outputted, (7) in a case when screen processing is executed in relation to input image data configured by a third density that is higher than the second density, for the plurality of submatrices, thresholds are arranged so that a dot of the first size is outputted, and (8) in a case when screen processing is executed in relation to input image data configured by a density higher than the third density, in accordance with the density of the input image data becoming higher, thresholds are arranged so that the size of a configured dot becomes larger.

\* \* \* \* \*